(No Model.) 7 Sheets—Sheet 1.

J. & G. FERGUSON.
LASTING MACHINE.

No. 575,029. Patented Jan. 12, 1897.

(No Model.) 7 Sheets—Sheet 2.

J. & G. FERGUSON.
LASTING MACHINE.

No. 575,029. Patented Jan. 12, 1897.

Witnesses
Wm. S. Brown
N. P. Ockington

Inventors
James Ferguson
George Ferguson
By David Hall Rice
Atty.

(No Model.)
J. & G. FERGUSON.
LASTING MACHINE.
No. 575,029.
7 Sheets—Sheet 3
Patented Jan. 12, 1897.
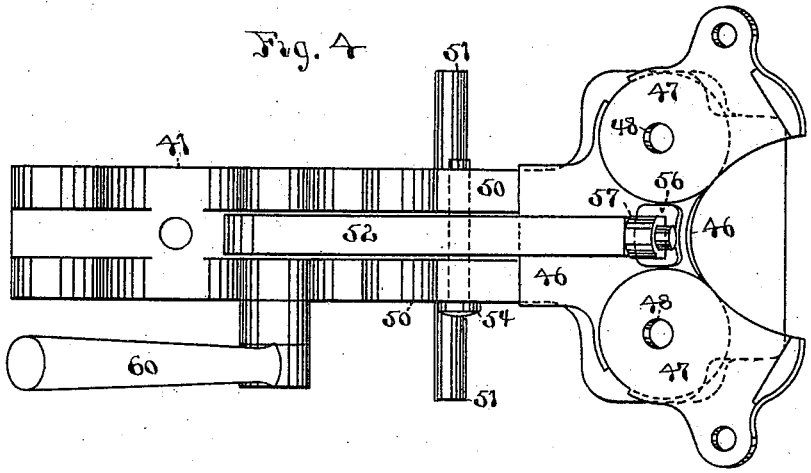
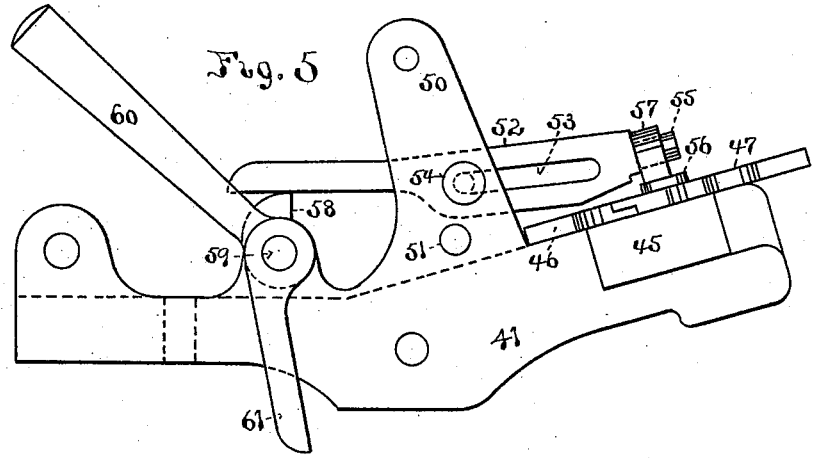

(No Model.) 7 Sheets—Sheet 4.
J. & G. FERGUSON.
LASTING MACHINE.
No. 575,029. Patented Jan. 12, 1897.
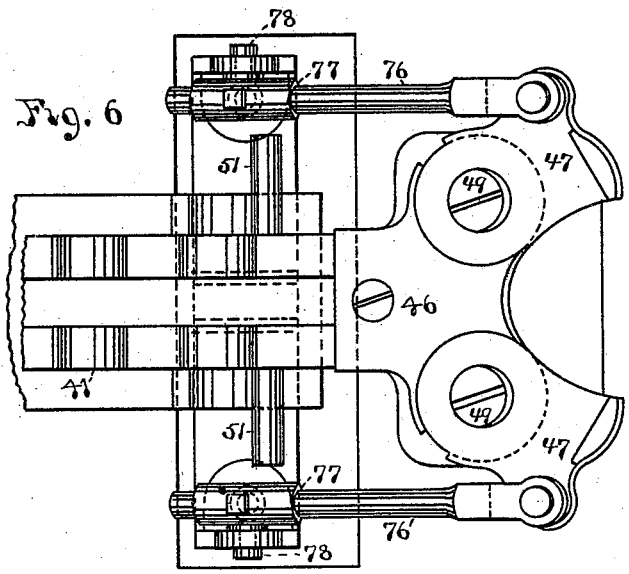
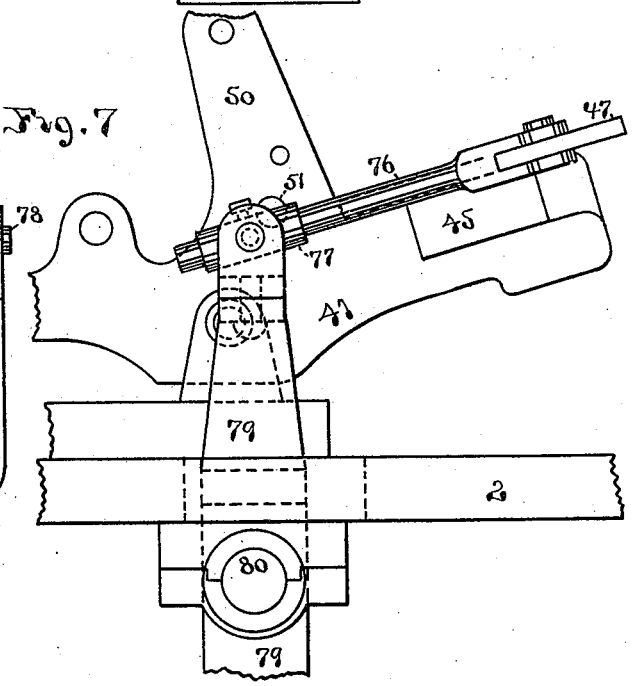
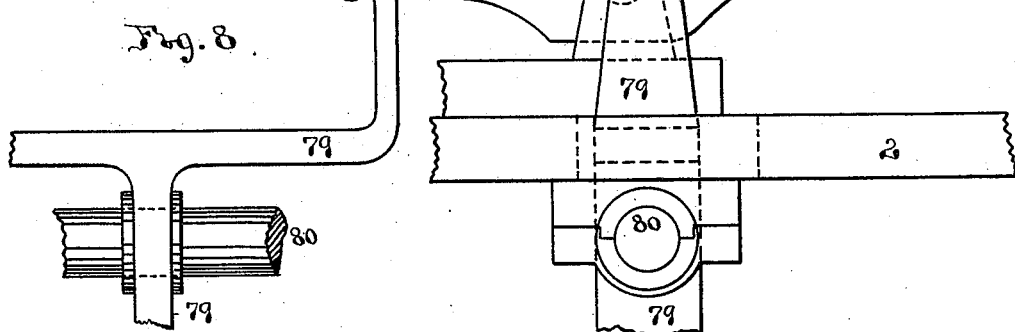

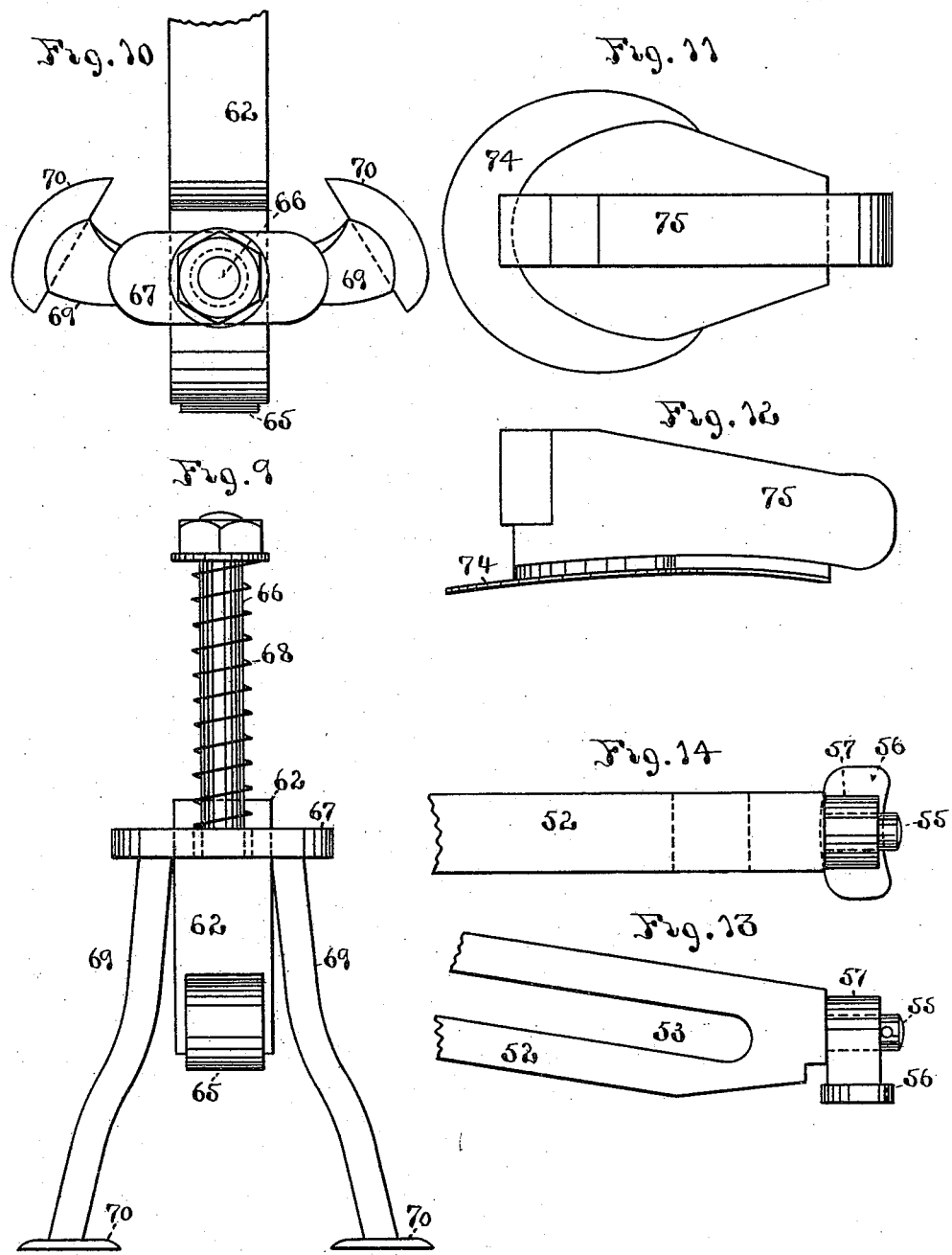

(No Model.) 7 Sheets—Sheet 6.

J. & G. FERGUSON.
LASTING MACHINE.

No. 575,029. Patented Jan. 12, 1897.

Witnesses
Wm. S. Brown
N. P. Ockington

Inventors
James Ferguson
George Ferguson
By Ben J. Hall Rice
Atty.

(No Model.) 7 Sheets—Sheet 7.
J. & G. FERGUSON.
LASTING MACHINE.
No. 575,029. Patented Jan. 12, 1897.
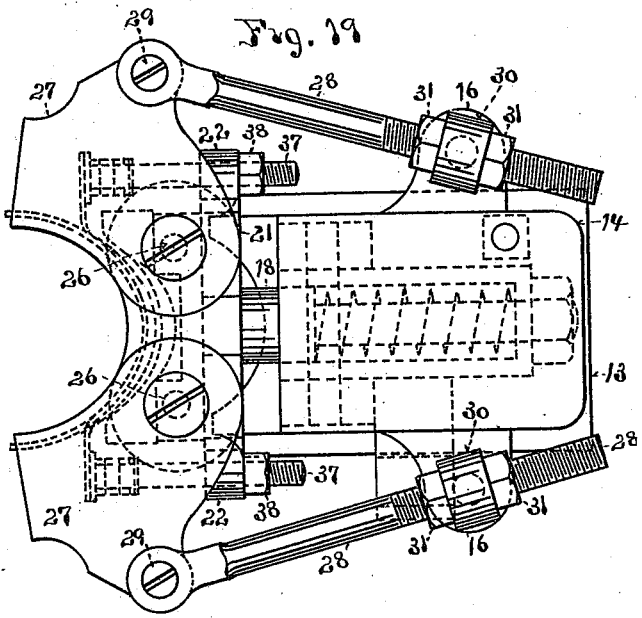
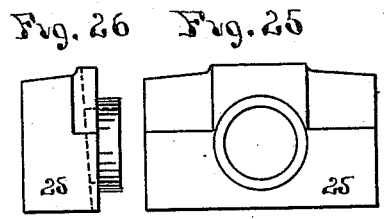
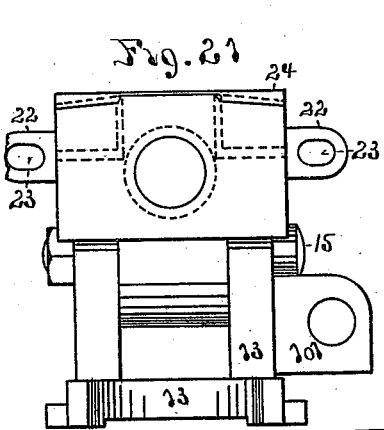
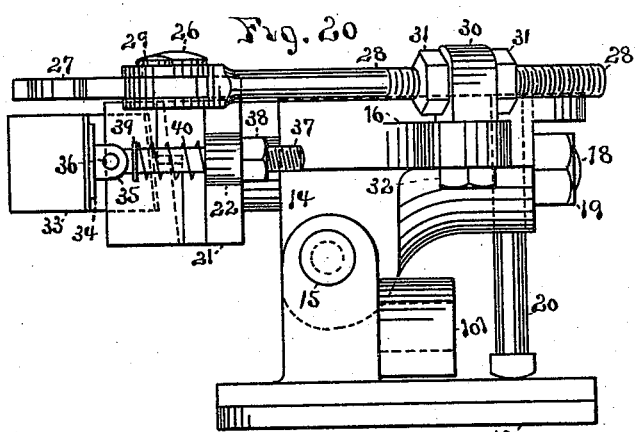
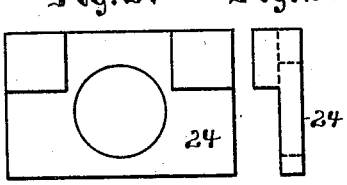
Witnesses
Inventors

UNITED STATES PATENT OFFICE.

JAMES FERGUSON AND GEORGE FERGUSON, OF BRIDGEWATER, MASSACHUSETTS; HOSEA KINGMAN ADMINISTRATOR OF SAID JAMES FERGUSON, DECEASED; SAID KINGMAN ASSIGNOR TO SAID GEORGE FERGUSON, ARTHUR D. FERGUSON, AND MARY E. FERGUSON, OF SAME PLACE.

LASTING-MACHINE.

SPECIFICATION forming part of Letters Patent No. 575,029, dated January 12, 1897.

Application filed September 5, 1889. Serial No. 323,061. (No model.)

*To all whom it may concern:*

Be it known that we, JAMES FERGUSON and GEORGE FERGUSON, of Bridgewater, in the county of Plymouth and State of Massachusetts, have invented certain new and useful Improvements in Lasting-Machines, of which the following is a specification.

Our invention relates to machines for lasting boots and shoes; and it consists in certain novel constructions and combinations of the same, substantially as hereinafter described and claimed.

Figure 1:
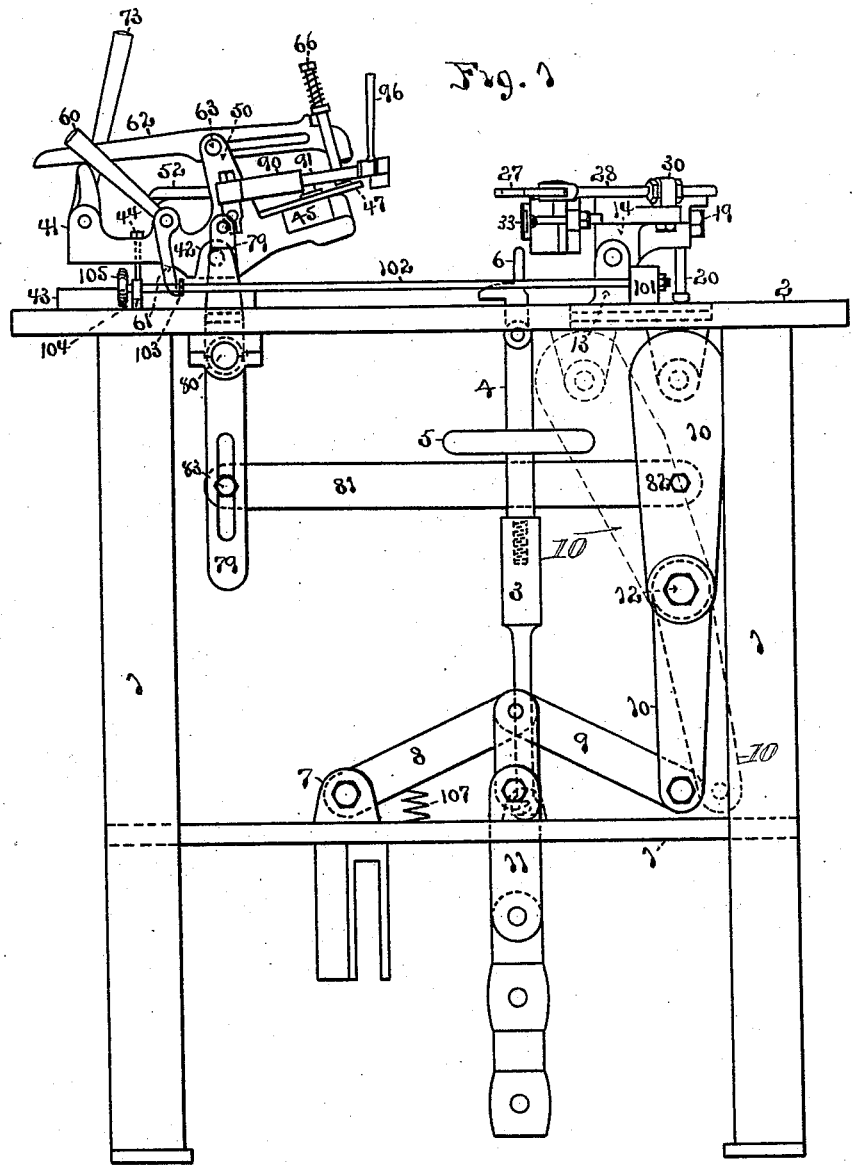
Figure 2:
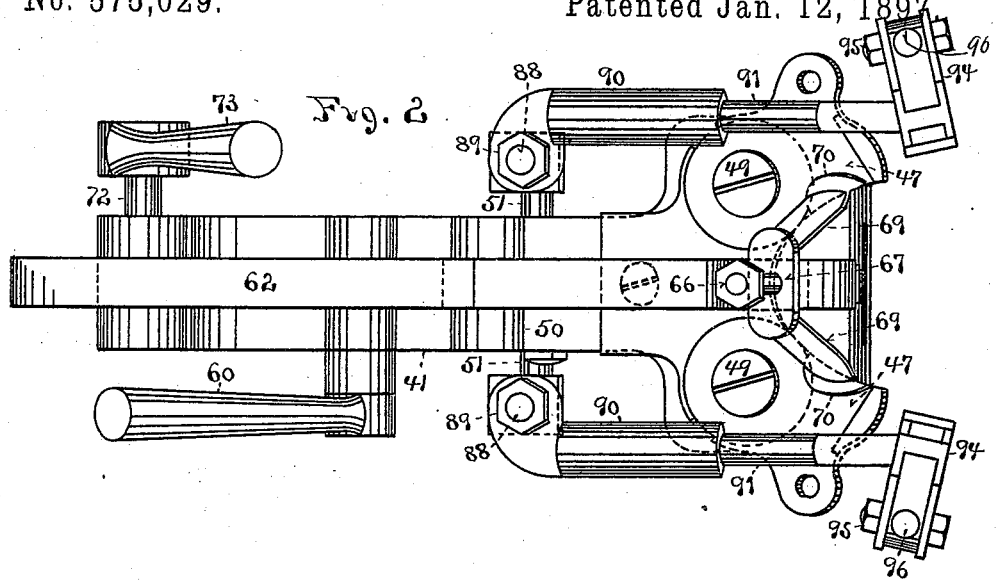
Figure 3:
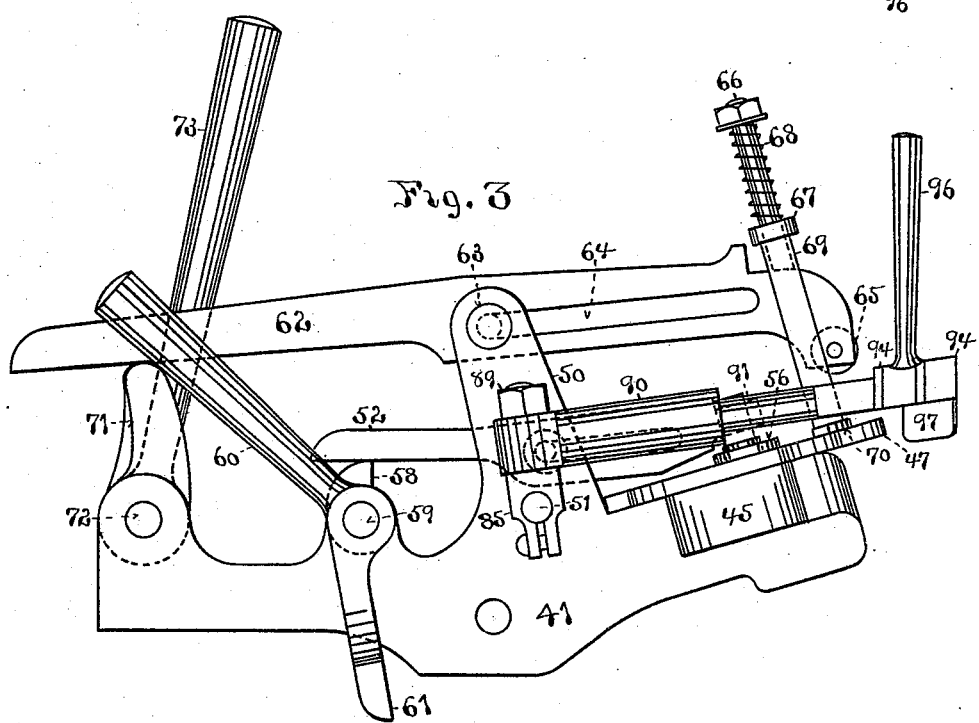
Figure 16:
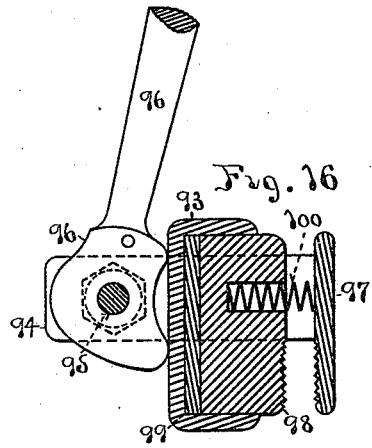
Figure 24:
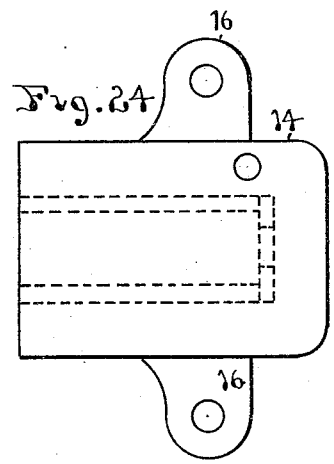
Figure 23:
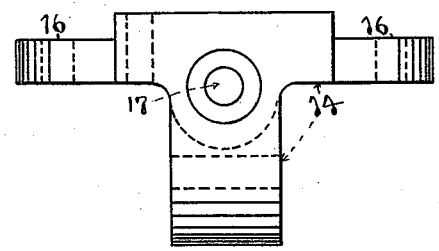
Figure 22:
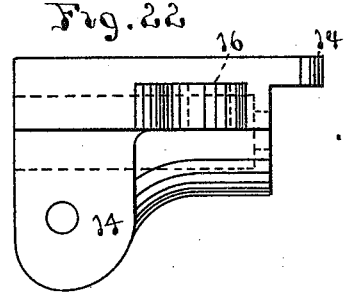
Figure 15:
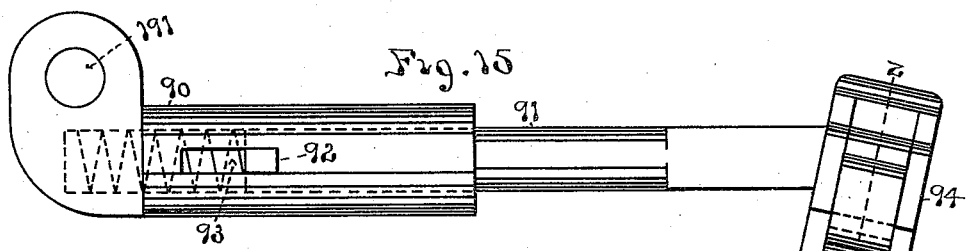
Figures 17, 18:
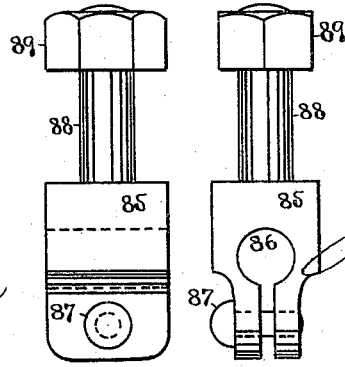

In the drawings, Figure 1 is a side elevation of a lasting-machine constructed according to our improvements. Fig. 2 is a top plan view of the toe-lasting mechanism detached from the machine. Fig. 3 is a side elevation of the same. Fig. 4 is a top plan view of the same with a portion of the mechanism detached. Fig. 5 is a side elevation of Fig. 4. Fig. 6 is a top plan view of the same, showing the mechanism for operating the wipers. Fig. 7 is a side elevation of Fig. 6. Fig. 8 is a face view of a portion of the lever which operates the wipers, as shown in Fig. 7. Fig. 9 is an enlarged front end view of the lever which presses the last into the vamp, showing the frictional presser-feet attached thereto. Fig. 10 is a top plan view of the same. Fig. 11 is a top plan view of the presser-plate, which is laid upon the insole to last the shoe. Fig. 12 is a side elevation of same. Fig. 13 is a side elevation of the clamping-plate which grasps the toe part of the vamp, with a portion of the lever operating the same. Fig. 14 is a top plan view of Fig. 13. Fig. 15 is an enlarged top view of the grippers for the toe-lasting device shown in Figs. 2 and 3 detached. Fig. 16 is a sectional view of same on line $z\,z$ of Fig. 15. Fig. 17 is a side elevation of the swivel-joint piece used to hold the arm of the nipper shown in Fig. 15 in place. Fig. 18 is an end view of same. Fig. 19 is a top plan view of the heel-lasting mechanism detached from the frame. Fig. 20 is a side elevation of the same. Fig. 21 is a rear end view of the same with a portion of the working parts detached. Fig. 22 is a side elevation of the block which carries the heel-lasting mechanism detached from the other parts. Fig. 23 is a rear end view of the same. Fig. 24 is a top plan view of the same. Fig. 25 is a rear end view of the portion of the block which carries the wipers of the heel-lasting mechanism detached. Fig. 26 is a side elevation of the same. Figs. 27 and 28 are respectively face and side views of parts of the compound block.

1 is the frame of the machine, carrying the table 2 on top of it. The post 3 is pivoted to the top of one of the cross-girths and has a threaded socket in its upper end, (indicated by dotted lines.) In this socket the screw-thread at the lower end of the shaft 4 is fitted. This shaft is provided with the hand-wheel 5, which raises and lowers the shaft in the post 3. At the upper end of shaft 4 is pivoted the shouldered pin 6, upon which the heel part of the last is fitted by a hole in the last in the usual way. The turning of the hand-wheel 4 therefore raises the last with reference to the table. An ear 7 is attached to one of the cross-girths of the machine, and to this is pivoted the link 8 at one end, while the link 9 is pivoted to the other end. The opposite end of link 9 is pivoted to the dependent lever 10. From the pivot which joins links 8 and 9 depends the loop 11, into which the foot of the workman may be inserted to draw down the links 8 and 9, which throw the lower end of the lever 10 outward as it turns upon the pivot 12, which is supported in bearings attached to the frame. This throws the upper end of lever 10 inward toward the center of the table. The upper end of this lever is pivoted to the sliding stand 13, which moves horizontally on guideways in the table or bed 2, Figs. 1, 19, and 20. This stand 13 carries the block 14, which is pivoted to upwardly-projecting ears on the stand by the pivot 15. The block 14 has ears 16 16 projecting horizontally on each side of it with vertical holes through them, and it has a central longitudinal cylindrical chamber extending from its front end almost to its rear end, terminating in a smaller hole 17, which extends through its rear end, Fig. 23. Through this chamber the shaft 18 extends, which is made large enough to fit the chamber at its front end, and has a bolt or spindle portion extending through the hole 17, having the nut 19 screwed onto its outer end to hold it in place. The shaft 18 is turned down within the chamber and a spiral spring around its smallest part bears at one end against the shoulder formed by its larger part, and at the other end against the bottom of the chamber in block 14, thereby holding the nut on the outer end of this shaft closely against the block and pressing the shaft outward toward the center of table 2 of the machine. Underneath the rear end of block 14 the set-screw 20 bears upon the slide 13 at its lower head end and has its upper end tapped into a vertical hole in the block. By adjusting this set-screw the block is turned on its pivot 15 and held at the desired angle to the slide.

The shaft 18 carries attached to its front end the block 21, from the ends of which project the ears 22 22, having elongated holes 23 horizontally through them. To the front side of this block 21 is attached the compound block 24 25, which is carried on the end of shaft 18, which projects through block 21 into the compound block 24 25 and holds them together. Into this compound block 24 25 are pivoted by vertical pivots 26 26 the wipers 27 27, which are hollowed out on their inner edges to fit over the heel of the last and turn the vamp over it. To each of these wipers is attached at its outer edge the rod 28 by the screw-pivot 29. The other end of each rod 28 is threaded and passes through the ear 30, being held in the ear by the check-nuts 31 31. Each ear 30 is pivoted by a vertical stem through the corresponding ear 16 of the block 14 and has a nut 32 on its lower end to hold it in position. The ends of the rods 28, which pass through these ears, are somewhat smaller than the holes through the ears 30, and the joints at the pivots 29 are slightly loose, so as to allow the wipers a little play. The compound block 24 25 pivots or turns on the inner projecting end of the shaft 18.

Underneath the wipers 27 is a flexible curved strap or band 33, which is held by a strap 34 behind it, these straps or bands being made, preferably, of elastic steel. The strap 34 has ears 35 on its rear outer ends, which are attached by pivots 36 to bolts 37, which extend rearward through the holes 23 of the ears 22 and are held in place by nuts 38 on their threaded outer ends. Just behind the ears 35 collars 39 are attached to the bolts 37, and a spiral spring 40 surrounds each bolt 37, bearing at one end against the collar 39 and at the other end against the ear 22, holding the flexible straps 33 34 forward toward the center of the bed of the machine. The effect of this arrangement is that the straps 33 34, with the block 21 to which they are attached, are capable of revolving with the shaft 18 or tipping horizontally to accommodate themselves to the last, this motion being independent of the wipers 27, which are pivoted to the independent compound-block 24 25.

When the slide 13 is pushed forward against the last, (which rests against the toe-piece hereinafter described,) the yielding of the several blocks and the shaft 18 backward by the compressing of the spiral spring in the block 14 causes the wipers 27 27 to close up over the heel of the last, because their central pivots 26 26 move backward, while their outer pivots 29 29 are prevented from moving backward by the rods 28 28, which force the wipers together or toward each other on their inner curved faces, which project over the last, the heel of the last being meantime supported on the pin 6 before described. The flexible straps 33 34 have the capacity of accommodating themselves around the heel of the last by their flexibility, as well as tipping slightly to various inclinations, because their supporting-rods 37 37 can swing in the elongated holes 23 23 of the ears 22 22 to allow of this motion.

The toe-lasting mechanism of the machine is supported upon the block 41, which is pivoted in ears 42 upon the fixed block 43, secured to the table 2. A set-screw 44, Fig. 1, bearing at its lower end upon the block 43 and tapped through the block 41, adjusts the latter up and down upon its pivot to accommodate it to the angle required to last the shoe. The block 41 is enlarged or widened horizontally toward its inner end nearest the center of the table, and has a chamber made in that end on the upper side, which is filled with a block of rubber or other elastic material 45, making the contour of the chamber at its forward end approximating to that of the toe of the last. On top of the chamber is attached to the block 41 a plate 46, which projects out over the rubber block 45 in position for the toe of the last to pass under its projecting edge. (See Figs. 4 and 5.) Into this plate 46 on the opposite edges are cut circumferential openings, in which are placed the wipers 47 47, which have holes 48 through their centers in position to receive pivots, so that they shall revolve in the places formed for them in the plate 46. Pivots 49 49 are passed through these holes, Figs. 2 and 6, and tapped into the block 41 underneath, so that the wipers are firmly supported upon this block.

From the block 41 ears 50 50 project upward, and outwardly from these ears bolts 51 51 project horizontally on each side. Between these ears is placed the lever 52, having a longitudinal slot 53, through which the bolt 54 passes, securing the lever between these ears. On the end of this lever a pivot 55 projects, upon which is swung a gripper-plate 56 by its ear 57. This presser or gripper plate comes directly over the fixed plate 46, between the wipers 47 47. Between another portion of the ears 50 a cam 58 is pivoted on the shaft 59 in such a position as to take a bearing under the outer end of the lever 52 and, when it is slid as far forward as possible upon its pivot, press the gripper-plate 56 down upon the vamp-holding plate 46. The shaft 59 is operated by the handle 60, attached to the outer end thereof, and has a dog 61, projecting downward from the lever for the purpose hereinafter described. When this handle 60 is thrown forward, the lever 52 will be released and can then be drawn backward by sliding its pivot 54 through its slot 53, so as to remove it entirely out of the way of the vamp and last.

Above the lever 52 the lever 62 is pivoted between the ears 50 and the pivot 63, which passes through its slot 64. This lever has its inner end curved downward and bifurcated, and in this end a roller 65 is pivoted. The bolt or post 66 is fixed in the upper side of this lever and has a nut on its upper end. On this bolt plays up and down the cross-bar 67, which is held down by the spiral spring 68, placed between it and the nut. (See enlarged views, Figs. 2, 3, 9, and 10.) To the outer ends of cross-bar 67 are firmly attached the legs 69 69, terminating in presser-feet 70 70, which bear upon the upper faces of the wipers 47 47. This arrangement presses down upon the presser-feet with the force of the spiral spring 68, allowing them to yield, as hereinafter described.

At the outer end of the block 41 the cam 71 is pivoted between ears on the upper side of the block upon the shaft 72 in such position as to take a bearing under the outer end of the lever 62, when its shaft is revolved, and raise the outer end of the lever and depress its inner end. The handle 73 is attached to the outer end of the shaft 72, and by moving this the cam is operated as described. A plate 74, Figs. 11 and 12, is made of the contour of the toe of the last to be used, both in its exterior conformation at one end and its curvature, and is provided with a web 75, projecting upward and inclining toward the point end of the plate, which fits the extreme toe of the last. This web is of the proper width for the roller 65 in the lever 62 to take a bearing upon, and its inclination is made in order to bring its upper surface level when laid upon the last and carried forward under the roller, substantially as hereinafter described.

The wipers 47 and the plate 46 are so placed with relation to the recess 45 in the block 41 that when a last with the vamp upon it has its toe end inserted in the recess the plate 46 and the wipers will come over the last and vamp and turn the vamp over upon the insole, which is placed upon the bottom of the last. For this purpose the wipers 47 have attached to their outer edges by pivots passing through holes provided for the purpose the rods 76 76, which are capable of swinging on these pivots. The other ends of these rods pass through sleeves 77, in which they are secured by set-screws, as shown in Figs. 6 and 7. The sleeves 77 each have a pivot 78 on one side which passes through the end of a forked arm 79. This forked arm has one end of its fork coming up on each side through the machine-bed 2 in proper position to receive the pivot of the sleeve 77, so as to hold the rod 76 nearly parallel with the last. The forked arm 79 has a pivot 80, passing through boxes attached to the lower side of the machine-bed 2, on which it turns, and its single part extends downward in the form of a lever below this pivot and is slotted vertically to receive a bolt 83, which connects it to the link 81, which extends horizontally underneath the bed to the lever 10, to which it is connected by means of another bolt or pivot 82. This bolt 83 forms a pivotal connection between the lever 79 and link 81, and it can be raised and lowered in the slot of the lever 79, so as to give more or less throw to the upper end of the lever, as desired, and therefore through the rod 76 give more or less turning movement of the wipers 47 on their pivots 49.

When the lever 10 throws the slide 13 forward, this compresses the flexible strap 33 around the heel of the last and forces the toe of the last into the recess 45 against the elastic packing under the wipers 47 and plate 46. At the same time the forward movement of the link 81 closes these wipers 47 47 over the last.

On the pivots 51 51, which project from the block 41, as before described, are placed the clips 85, Figs. 17 and 18, the pivots entering the holes 86 in the clips and the requisite closeness of fit being secured by the set-screw 87 in the split part of the clip. In the upper part of each clip a bolt 88 extends upward, having on its upper end a nut 89. On this bolt is placed a swinging sleeved arm 90, the bolt passing through the hole 191. This arm 90 is bored out at its other end cylindrically, and a rod or arm 91 is fitted pistonwise into this cylinder and held therein by a key 92, passing through a transverse slot in the arm 90. A spiral spring 93 in the bottom of the cylinder presses against the inner end of the rod 91 and keeps it extended or drawn out as far as the key 92 will permit, the key holding the rod from turning in the cylinder.

The outer end of the rod 91 carries a nipper or clamp, which consists of the piece of metal 93, attached to the rod 91, with two side bars 94 passing through it horizontally, so as to slide back and forth. These side bars are pivoted by the pivot 95 to the cam-lever 96, which takes a bearing against the rear side of the piece 93. To the opposite ends of the side bars 94 are attached the jaw 97, and in the chambered part of piece 93, opposite to this jaw, is set another one, 98, against a packing of rubber 99. The spiral spring 100, which is placed in a socket in jaw 98 and presses against the inner face of the jaw 97 serves to keep the jaws apart until the cam-lever 96 is thrown over, which, drawing the side bars 94 through the part 93, closes the jaws firmly together.

It will be observed that while the rod 91 is susceptible of being swung inward and outward in a plane approximately horizontal and up and down in a plane approximately perpendicular, the jaws 97 98 are always held in the same vertical position ready to receive the edges of the vamp during the lasting operation.

The operation of our machine is as follows: The vamp is first placed in the machine and its toe edge folded over the curved edges of the wipers 47 and the plate 46. The clamping-plate 56, with its lever 52, is then thrown forward and clamped down upon the inner surface of the vamp by means of the cam 58 and handle 60, pressing the center of the toe part of the vamp down upon the plate 46. The nipper-jaws 97 98 are also brought over the upwardly-projecting edge of the vamp and closed upon it on each side. The last is then slipped into the vamp, having been previously prepared by having an insole attached to it, and the plate 74 is laid over the toe part of this insole with its end coinciding with the toe of the last. The last is pressed down upon until its heel part rests upon the pin 6, the parts of the machine being in the position shown in Fig. 1, and the lever 62 is thrown forward, so as to bring the presser-feet 70 upon the inner surface of the folded-over edge of the vamp, pressing it down upon the wipers 47 47 with the amount of pressure due to the coiled spring 68. It will now be seen that the toe part of the vamp is held positively at its center by the clamp 56 and at its sides by the jaws 97 98 positively, but that it is held frictionally on its folded-over edge upon the wipers between these two points by the feet 70 70, which have the capacity to yield upward and allow the vamp to slip from under them when a certain amount of pressure is exerted. The lever 69, when compressed at its roller end by the cam 71 at its other end, after bringing the feet 70 upon the vamp, as described, bears down the plate 74, resting upon the bottom of the last by its roller 65 coming in contact with the web 75 on the plate, and it thus crushes or presses the last down into the vamp, stretching the latter over the upper side of the last, which is downward. The feet 70 and their cross-bar 67 yield upward to allow this operation, increasing their pressure upon the edges of the vamp somewhat as the last is crowded down into it, but at the same time allowing the vamp to slip from under them, whatever may be necessary to allow the last to move downward after the leather is properly stretched over its upper surface. The toe of the last having been brought below the wipers 47 by this process, the foot-treadle is pressed upon, drawing down the levers 8 and 9 and moving outward the lower end of lever 10. This throws forward the heel-lasting mechanism and forces the toe of the last and vamp under the plate 46 and wipers 47. The wipers 27 and 47 are at the same time drawn forward so as to hold the edge of the vamp at the heel and toe over the outer edge of plate 74, the leather slipping from under the feet 70 as the wipers move forward. At a certain point in this forward movement of the last and vamp it is found necessary to release the presser-foot 56 from the toe of the vamp in order to prevent undue straining and weakening of the leather over the extreme toe of the last, and this might be done by hand by lever 60, but is best accomplished automatically as follows:

On the side of block 13 an ear 101 is formed, into which is screwed one end of the rod 102, which is held in the position to which it may be screwed for adjustment by a check-nut on its outer end. The other end of the rod 102 slides through an ear 104, fixed to the table 2. On this rod is attached a collar 103 in proper position to impinge against the dog 61 of the cam 58 and trip the cam when the block 13 is moved forward, as described. A hand-wheel 105, attached to the end of the rod, is used to screw or adjust it back and forth in the block 101. The collar 103 being adjusted in the right position when the last and vamp is moved forward, as described, trips its cam and releases the lever 52, thereby releasing the toe part of the vamp and allowing it to continue to slide under the plate 46 and wipers 47 and be folded under them until that operation is completed. The heel-wipers 27 27 have in the meantime folded the vamp over the heel of the shoe and the lever 52 is now drawn back out of the way, the cam 71 is tripped by its handle 73, and lever 62 is also drawn back out of the way, releasing the plate 74 from under the roller 65. The plate 74 is then removed and the edges of the folded-over vamp, then lying upon the insole, are tacked at the toe and heel, when the motion upon levers 8 and 9 is reversed, the heel-lasting mechanism withdrawn, and the lasted vamp and its last taken out from the machine. This withdrawal of the block 13 is accomplished by means of a spiral spring 107, placed under the toggle-lever 8, which lifts the lever as soon as the foot is taken off of the loop 11 and withdraws the several parts, so that the shoe may be taken out.

It will be noted that as the last moves forward, as above described, the lever-roller 65 rolls along over the web 75 of the plate 74; also, that the jaws 97 98 are allowed to move forward in the same direction by means of the rods 91, compressing the spiral spring 93, which allows the rod and its jaws to travel along with the last, but continually produces a greater draw or pressure of the sides of the vamp (which are grasped between the jaws) toward the heel part of the last.

What we claim as new and of our invention is—

1. The combination, in a lasting-machine, of the block, 41, having the cavity therein adapted to receive the toe of the last, and vamp around it, the central plate, 46, overlapping said cavity, and the pivoted wipers 47, 47, hung on each side of said central plate, and forming with it a continuous wiper edge, adapted to fold the edge of the vamp over the insole upon the last, and allow of its being tacked in that position, substantially as described.

2. The combination, in a lasting-machine, of the block, 41, having the cavity therein, adapted to receive the toe of the last with the vamp thereon, the central plate, 46, overlapping said cavity, the clamping-plate, 56, adapted to clamp the edge of the vamp to said central plate, and the pivoted wipers 47, 47, hung upon each side of said central plate and adapted to swing horizontally over the toe of the last and hold the vamp thereon, while being tacked, substantially as described.

3. The combination, in a lasting-machine, of the block, 41, having the cavity therein adapted to receive the toe of the last with the vamp thereon, the central plate, 46, overlapping the said cavity, the clamping-plate, 56, adapted to clamp the edge of the vamp to said central plate, the pivoted wipers 47, 47, hung upon each side of said central plate and adapted to swing horizontally over the toe of the last and hold the vamp thereon, and the presser-feet, 70, 70, adapted to press the edge of the vamp upon said wipers and allow the same to slip through beneath them during the folding process, substantially as described.

4. The combination, in a lasting-machine, of the central fixed toe-plate, 46, the clamping-plate 56, the pivoted wipers 47, 47, and the pairs of jaws, 97, 98, on each side of the vamp, substantially as described.

5. The combination, in a lasting-machine, of the flexible heel-band, 33, sustained upon pivoted plungers at the ends thereof, the latter being mounted upon the reciprocating block, 13, and the toe-lasting mechanism, substantially as described.

6. The combination of the toe-block, 41, provided with a cavity adapted to receive the toe of the last with the vamp thereon, the jaws 97, 98, on each side thereof mounted on plungers 91 moving in pivoted tubes 90 and extruded therefrom by the springs 93 so as to be adapted to swing laterally in and out and to yield to the movement of the last lengthwise, and the heel-block arranged to force the last forward toward the toe-block, substantially as described.

7. The combination, in a lasting-machine, of a fixed toe-block, provided with pivoted wipers, and a swinging pivoted heel-block, provided with wipers which adjust themselves to the angle of the last as it swings with the latter and arranged to move forward toward the toe-block and force the last and vamp under the wipers thereof, substantially as described.

8. The combination, with a toe-lasting machine, of the separate plate, having its outer edge substantially coinciding with that of the insole, and arranged to allow the vamp to be folded over it capable of being removed from over the insole, and a lever attached to the machine, arranged to take a bearing thereon and force the last into the vamp, substantially as described.

JAMES FERGUSON.
GEORGE FERGUSON.

Witnesses:
JOSEPH TOOKER,
MARY D. EDSON.